No. 680,027. Patented Aug. 6, 1901.
J. DESCHAMPS.
QUICK WATER HEATING DEVICE.
(Application filed May 13, 1901.)
(No Model.)
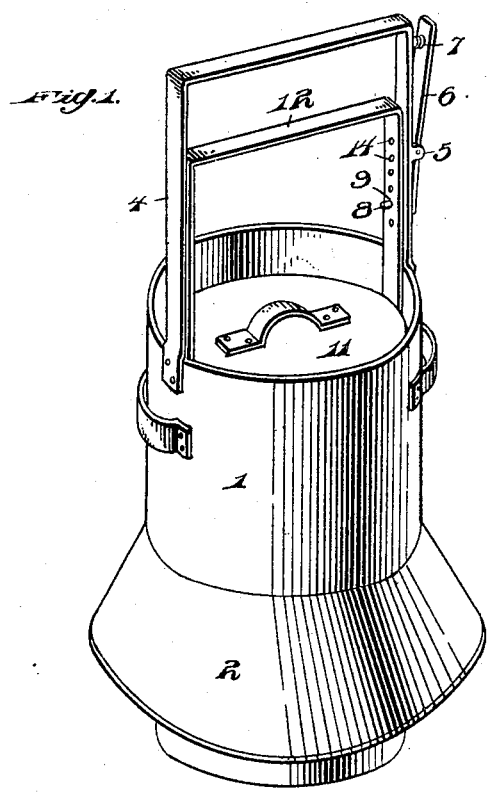
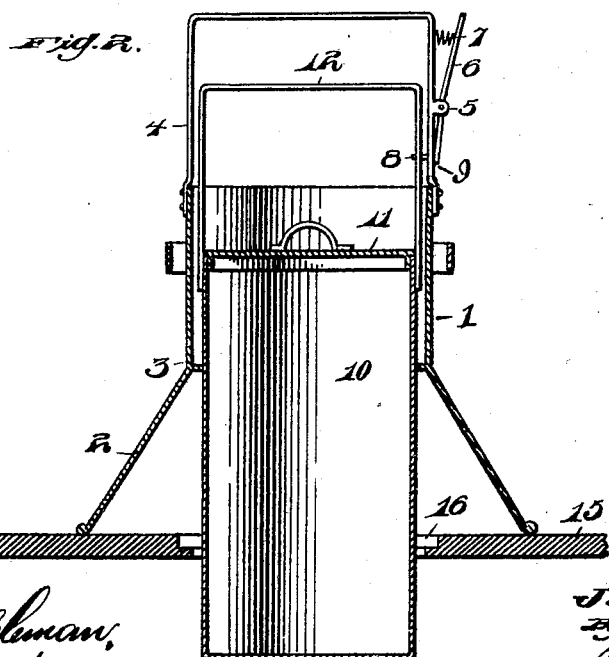

UNITED STATES PATENT OFFICE.

JOSEPH DESCHAMPS, OF HAZELHURST, PENNSYLVANIA.

QUICK WATER-HEATING DEVICE.

SPECIFICATION forming part of Letters Patent No. 680,027, dated August 6, 1901.

Application filed May 13, 1901. Serial No. 59,942. (No model.)

*To all whom it may concern:*

Be it known that I, JOSEPH DESCHAMPS, a citizen of the United States of America, residing at Hazelhurst, in the county of McKean and State of Pennsylvania, have invented certain new and useful Improvements in Quick Water-Heating Devices, of which the following is a specification, reference being had therein to the accompanying drawings.

This invention relates to certain new and useful improvements in water-heaters, and more particularly to cooking utensils and the like.

The invention has for its object the provision of novel means whereby the utensils may be conveniently raised and lowered to any desired position in the stove and suspended in a manner that will positively lock the same at any desired distance or height from the flames.

The invention has for its further object to construct a device of the above-described class that will be extremely simple in construction, strong, durable, and comparatively inexpensive to manufacture.

Briefly described, the invention consists of a cylindrical outer casing which terminates at its lower end in a flaring hood that is adapted to rest on the stove-top when the device is in position thereon. The outer casing carries an interior annular flange located at the top of the flaring hood, and this casing also has secured thereto at its upper end a handle which carries a spring-pressed lever. The lower end of this lever extends through the said handle and engages in a handle carried on the upper end of an inner vessel adapted to slide vertically within the annular flange carried by the outer casing. The spring-pressed lever being secured to the handle of the outer casing and engaging the handle carried by the inner vessel locks the latter at the position in which it has been placed.

The invention finally consists in the novel combination and arrangement of parts to be hereinafter more fully described, and specifically pointed out in the claim.

In describing the invention in detail reference is had to the accompanying drawings, forming a part of this specification, and wherein like numerals of reference indicate corresponding parts throughout the several views, in which—

Figure 1 is a perspective view of my improved utensil. Fig. 2 is a vertical sectional view thereof.

In the drawings the reference-numeral 1 indicates the cylindrical casing, carrying at its lower extremity a hood 2, which is formed integral with the casing 1. At the junction of the lower extremity of the casing and the hood 2 is secured an inner annular flange 3.

The reference-numeral 4 represents a handle attached to the outer casing 1. On the side of said handle are secured apertured lugs 5, between which is pivotally mounted a spring-pressed lever 6. Between the side of the handle and the inner face of the spring-pressed lever 6 is arranged a spiral spring 7. The other end of the spring-pressed lever is bent inwardly, as shown at 8, and extends through the aperture 9, formed in the side of the handle 4.

The reference-numeral 10 indicates a vessel carrying a lid 11. Said vessel is also provided with a rigidly-secured handle 12. This handle upon the engaging side has formed therein a series of apertures 14. Into one of these apertures the inwardly-extending end 8 of the spring-pressed lever is inserted, forming a lock between the handles 12 and 4 and providing means whereby the vessel 10 is suspended in proper position.

The reference-numeral 15 indicates the top of the stove, having the usual opening 16 formed therein to receive the vessel 10. Said vessel may extend into the stove any suitable distance or may be adjusted to a position with the bottom of the vessel upon the upper face of the stove. By reason of the hood engaging the upper face of the stove it will be seen that the sides of the vessel 10 will be heated as well as the bottom thereof. The spring 7 is arranged in such a manner as to normally press the inwardly-extending end of the spring-pressed lever into engagement with the handle 12 of the vessel, and in order to release the same it is only necessary to exert a slight pressure upon the side of the upwardly-extending end of the spring-pressed lever. By releasing the spring-pressed lever the engagement will again be formed with the handle 12 and the vessel suspended and retained in its proper position.

The many advantages obtained by the use of my improved device will be readily apparent from the foregoing description, taken in connection with the accompanying drawings.

It will be noted that various changes may be made in the details of construction without departing from the general spirit of my invention.

Having fully described my invention, what I claim as new, and desire the secure by Letters Patent, is—

In a device of the character described, a cylindrical outer casing terminating at its lower end in a flaring hood with an interior annular flange at the upper end of the hood, a handle rigidly connected to the upper end of said casing and provided in one side with an aperture, lugs carried by said handle, a spring-pressed lever pivoted in said lugs with its lower end projecting through the aperture in the handle, an inner cylindrical vessel fitted to slide vertically within the annular flange carried by the outer casing, a removable lid for said vessel, and a handle rigidly secured to said vessel and provided in one side with a series of apertures to receive the projecting end of the spring-pressed lever for supporting the inner vessel in the position to which it has been adjusted, substantially as described.

In testimony whereof I affix my signature in the presence of two witnesses.

JOSEPH DESCHAMPS.

Witnesses:
JOHN NOLAND,
E. E. POTTER.